United States Patent
Boss et al.

(10) Patent No.: US 7,681,195 B2
(45) Date of Patent: Mar. 16, 2010

(54) SYSTEM, METHOD, AND SERVICE FOR EFFICIENT ALLOCATION OF COMPUTING RESOURCES AMONG USERS

(75) Inventors: Gregory J. Boss, American Fork, UT (US); Rick A. Hamilton, II, Charlotteville, VA (US); Kevin C. McConnell, Austin, TX (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1737 days.

(21) Appl. No.: 10/816,619

(22) Filed: Apr. 2, 2004

(65) Prior Publication Data

US 2005/0222819 A1 Oct. 6, 2005

(51) Int. Cl.
*G06F 9/46* (2006.01)
(52) U.S. Cl. ...................... 718/104; 718/107
(58) Field of Classification Search .............. 718/104, 718/107
See application file for complete search history.

(56) References Cited

U.S. PATENT DOCUMENTS

| | | | | |
|---|---|---|---|---|
| 5,111,391 | A | | 5/1992 | Fields et al. ................ 364/401 |
| 5,247,687 | A | * | 9/1993 | Eilert et al. ................ 718/104 |
| 5,872,974 | A | * | 2/1999 | Mezick ..................... 717/109 |
| 6,049,776 | A | | 4/2000 | Donnelly et al. ............... 705/8 |
| 6,275,812 | B1 | | 8/2001 | Haq et al. ................... 705/11 |
| 6,966,033 | B1 | * | 11/2005 | Gasser et al. ............... 715/738 |
| 2001/0039581 | A1 | * | 11/2001 | Deng et al. ................. 709/226 |
| 2002/0062242 | A1 | | 5/2002 | Suzuki ....................... 705/10 |
| 2002/0165749 | A1 | | 11/2002 | Northcutt et al. .............. 705/8 |
| 2002/0165892 | A1 | * | 11/2002 | Grumann et al. ........... 709/100 |
| 2003/0055749 | A1 | | 3/2003 | Carmody et al. ............. 705/28 |
| 2003/0120589 | A1 | | 6/2003 | Williams et al. ............. 705/38 |
| 2003/0130881 | A1 | | 7/2003 | Culderaro et al. ............. 705/8 |
| 2004/0117476 | A1 | * | 6/2004 | Steele et al. ................ 709/224 |

* cited by examiner

*Primary Examiner*—Meng-Ai An
*Assistant Examiner*—Camquy Truong
(74) *Attorney, Agent, or Firm*—Cahn & Samuels, LLP

(57) ABSTRACT

A computing resource allocation system allocates hardware and software resources among employees, based upon a combination of the employee level, job function, and demonstrated workstation performance within the context of the job requirements of the employee and usage patterns of the computing resource. The system collects various performance data for computing resources. A set of policy rules is applied to the collected performance data and processed by the present system. Consequently, the present system automatically identifies and prioritizes employees in need of technology upgrades and replacements based on business needs and available resources. Performance data of a computing resource is captured and transmitted to a central collection agency. From the performance data, the present system determines when partial upgrades, such as memory additions or faster adapters are appropriate based on system performance or errors. In addition, the present system determines when a computing resource experiences continuous performance problems.

30 Claims, 4 Drawing Sheets

SYSTEM, METHOD, AND SERVICE FOR EFFICIENT ALLOCATION OF COMPUTING RESOURCES AMONG USERS

FIELD OF THE INVENTION

The present invention generally relates to monitoring performance of computing resources such as computers. More specifically, the present invention pertains to applying policy rules to collected performance data to best allocate hardware and software resources among employees in an automatic fashion within the context of job requirements of an employee and usage patterns of a computing resource.

BACKGROUND OF THE INVENTION

With most modern businesses relying on computing resources for business efficiency and competitive advantage, it is imperative that key employees have access to the type of computing equipment required to effectively execute their jobs. In today's information technology (IT) environment, keeping employee computer systems running at an optimal level is a challenge that occupies many people. The problems inherent in this challenge are that of either over-allocation or under-allocation of resources to specific employees.

Over-allocation may be illustrated by the case where a "top of the line" new computer system is delivered to a new employee with little need for the hardware or software he or she has been assigned. By providing a cutting-edge system to an entry-level employee with need for little more than email functionality, the corporation or issuing entity has effectively wasted money and has mismanaged important business resources. In such over-allocation, the company may be delivering a $2,000 system to an employee whose needs may be met by a $500 system or through reuse of an older, "surplus" system.

Under-allocation creates productivity problems as well as other more subtle problems. For example, the issuance of a low-end system to a customer-facing marketing executive creates a problem with perceived corporate competence by the customer. One can easily imagine a case where such an executive delivers a presentation before an important client and that client is unimpressed by the poor performance of the computer system and the delivery of the presentation. Consequently, under-allocation has the possible business impact of lost revenue and client goodwill. Similarly, a developer with significant computational needs may be assigned, an old, outdated system. In doing so, he or she may be forced to endure very long compile times or computational modeling times with a business impact of wasted productivity and delays to market.

Keeping employee computer systems running in optimum condition also comprises trading available resources with a corporate budget. As employees experience difficulties with computers, the issue becomes whether to repair or replace the system. A further issue is the need to objectively prioritize computing resource needs to best maximize company performance and productivity. Currently, corporate policies regarding computing resource replacement require replacement based on life of the computing resource. However, an employee that is using a computer at full capacity may experience substantial performance degradation long before the replacement cycle provides a new computing resource. Conversely, an employee using a computing resource in a minimal fashion may be able to use the same computing resource longer than the replacement cycle indicates.

Currently, performance issues are resolved when an employee contacts their manager or a corporate help desk and complains about poor system performance. An IT staff member then typically looks at the system and attempts to determine if a problem exists. After a lengthy process, a repair, upgrade, or replacement option may be pursued. This process can become very burdensome, particularly in environments where many users and computers exist. Meanwhile, the employee is experiencing a reduction in productivity while dealing with inadequate performance from their computer.

What is therefore needed is a system, a service, a computer program product, and an associated method to monitor the performance of computation resources and objectively distribute important computing resources on the basis of computer resources need, job functions, and responsibilities. The need for such solution has heretofore remained unsatisfied.

SUMMARY OF THE INVENTION

The present invention satisfies this need, and presents a system, a service, a computer program product, and an associated method (collectively referred to herein as "the system" or "the present system") for best allocating hardware and software resources among employees based upon a combination of the employee level, job function, and computer performance, usage patterns, and computer performance need within the context of the job requirements of the employee. The present system collects various performance data for computing resources. A set of policy rules is applied to the collected performance data and processed by the present system. Consequently, the present system automatically identifies and prioritizes employees in need of technology upgrades and replacements based on business needs and available resources.

The present system provides an objective and automated system whereby computer resources in need of upgrade or replacement are identified and prioritized based on business requirements. Performance data of a computing resource is captured and transmitted to a central collection server. From the performance data, the present system determines when partial upgrades such as, for example, memory additions or faster adapters are appropriate based on system performance. In addition, the present system determines when a computing resource experiences repetitive performance problems. These performance problems represent poor work productivity for the user and indicate that replacement of a computing resource is appropriate.

The present system determines when error conditions are present in the computing resource that require partial upgrades, parts replacement, or replacement of the computing resource. Further, the present system applies policy rules to the collected performance data such that employees in critical roles, such as customer-facing positions, management positions, or other revenue-generating positions are given a higher priority for upgrades and system replacements as such resources become available.

Priority may be assigned in different ways. For example, a heavier weight in a weighted system could be used. Alternatively, it is possible to assign a mandatory priority, such as, for example: this class of person will always go to the top of the list, as compared to the heavier weight model wherein a heavier weight in conjunction with low resource needs would not necessarily make that person a higher priority over a developer with greater need and large revenue generating missed opportunity.

In addition, the present system applies policy rules to the collected performance data such that employees of equivalent rank or importance are assigned a priority for replacement of computer resources based on usage of the computer resource rather than an arbitrary replacement schedule such as, for example, every three years. Usage of the computing resource is measured, for example, by keyboard strokes or composite performance parameters or metrics.

The present invention may be embodied in a utility program such as an automatic hardware allocation utility program. The present invention also provides means for the user to specify an optimum allocation of resources that meets budgetary constraints. The present invention further provides means to identify an optimum allocation of component and computer hardware replacements and upgrades based on an employee's job description and level.

The present invention further provides means for the user to identify an optimum allocation of component and computer hardware replacements and upgrades based on a usage of a computing resource and available resources for providing those replacements and upgrades. Furthermore, the present invention provides means for the user to identify criteria or metrics which indicate a level at which a component or computing resource is replaced or upgraded. The criteria or metrics are tables correlating employee job description and level with allowed component and computer performance.

The user may invoke the automatic hardware allocation utility to monitor computing resources, identify components and computing resources requiring replacement or upgrade, prioritize component and computing resource replacement or upgrade, and recommend resource allocation to employees that maximizes productivity with respect to the use of company resources. The set of requirements comprises a table of metrics correlating employee level and employee job description with allowed performance of the component or the computing resource.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standards protocols to form a global, distributed network.

Software Metric (Metric): Software measurements that use numerical ratings to quantify allowable performance of an application or a computer system.

World Wide Web (WWW, also Web): An Internet client-server hypertext distributed information retrieval system.

Figure 1:
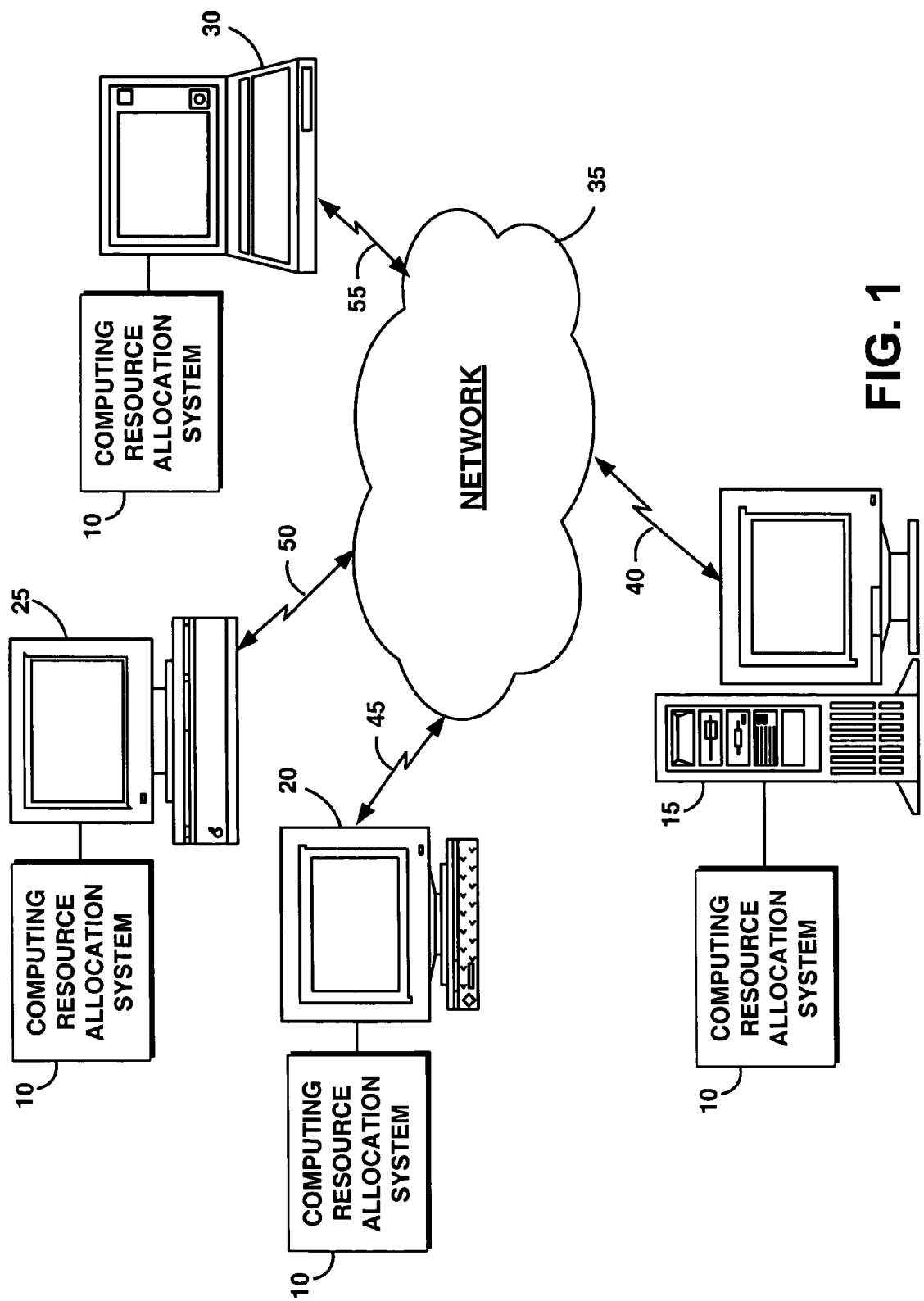
FIG. 1 is a schematic illustration of an exemplary operating environment in which a computing resource allocation system of the present invention can be used.

FIG. 1 portrays an exemplary overall environment in which a system, a service, and an associated method for efficient computing resource allocation according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. Computers 20, 25, 30 comprise desktop computers, workstations, laptop computers, mainframe computers, or any other device that may be connected to a network and that operates software applications or performs computations. Computers 20, 25, 30 each comprise software that allows the user to interface securely with the host server 15. The host server 15 is connected to network 40 via a communications link 40 such as a telephone, cable, or satellite link.

Computers 20, 25, 30, can be connected to network 40 via communications links 45, 50, 55, respectively. While system 10 is described in terms of network 35, computers 20, 25, 30 may also access system 10 locally rather than remotely. Computers 20, 25, 30 may access system 10 either manually, or automatically through the use of an application.

Figure 2:
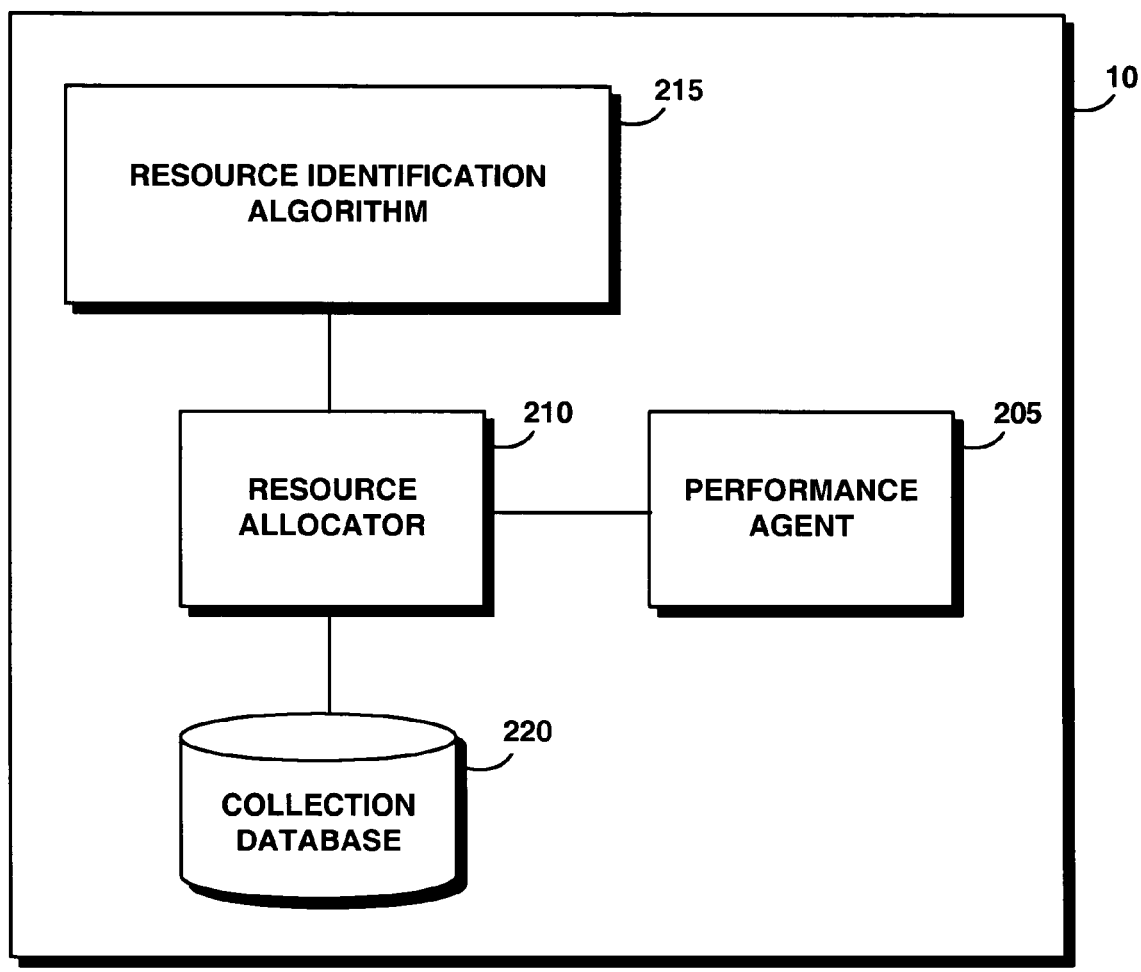
FIG. 2 is a block diagram of the high-level architecture of the computing resource allocation system of FIG. 1.

FIG. 2 is a block diagram illustrating a high-level architecture of system 10. System 10 comprises a performance agent 205, a resource allocator 210, a resource identification algorithm 215, and a collection database 220 (also referenced herein as collection dB 220). The performance agent 205 is installed on the computing resource of the user such as computers 20, 25, 30. The resource allocator 210, the resource identification algorithm 215, and the collection dB 220 are installed on the server 15.

The performance agent 205 captures performance data from computers 20, 25, 30 comprising:

time percentages in which computers 20, 25, 30 are engaged in "excessive" paging activity, where "excessive" may be defined according to variable thresholds;

time percentages in which computers 20, 25, 30 are engaged in "excessive" CPU utilization, where "excessive" may be defined according to variable thresholds;

time percentages in which computers 20, 25, 30 are constrained by I/O devices;

associations of system or application processes with the time percentages mentioned above; and events or errors that are logged by system 10 such as, for example, a failed installation of a software application due to less than minimum system requirements of the software application available from the computers 20, 25, 30.

Furthermore, the performance agent 205 may capture any performance parameter on computers 20, 25, 30 that can be used to determine how well computers 20, 25, 30 are performing and the extent to which computers 20, 25, 30 are being used by the user. In an embodiment, the performance parameters are based on average utilization of computers 20, 25, 30 rather than time percentages.

The performance agent 205 collects performance data regarding the performance of computers 20, 25, 30 and software applications running on computers 20, 25, 30 to obtain further insight into the source of the "excessive"resource activity. An "excessive" resource activity does not necessarily indicate a need for a component upgrade, a component replacement, or a new computing resource. For example, a process that takes more than 90% CPU utilization may indicate a user-invoked activity. A different process that takes more than 90% CPU utilization may indicate a sub-optimal software configuration problem related to, for example, file system indexing. In the former case, the excessive CPU utilization is considered more heavily by system 10 than the latter. System 10 recommends different responses to these two exemplary scenarios that optimally correct the source of the "excessive" resource activity.

Performance data collected by the performance agent 205 are forwarded on a periodic basis to the resource allocator 210 on server 15. The resource identification algorithm 215 then applies policy rules to the collected data.

The determination by system 10 of acceptable excessive paging in computers 20, 25, 30 can be determined by employee band and employee function. For example, a much higher level of excessive computer paging is tolerated for clerical employees at band 6 than for developer employees at band 10.

The acceptable limits that are initially defined can be altered dynamically from an end-user standpoint by related events. A person, such as the help center technician, could update the metric table, at which point all monitored stations will be evaluated based on the new value(s). For example, if a specific class of users constantly calls to complain about performance when paging is above 15%, and the current metric table allows for 20%, a decision may be made to reduce the current value to 14%. This process may also be automated. As an example, system 10 could periodically query the help center database, and if the trend just described is detected, the metric table is automatically updated.

As an example, the data collected by a "help center" operated by an information technology division for the employees within a corporation is a good indication of what employees consider acceptable performance ranges. If several employees of a like category call the "help center" and complain of performance problems with similar characteristics then the thresholds can be automatically weighted up or down accordingly by system 10.

When the resource allocator 210 identifies a trend of unacceptable excessive paging on, for example, computer 20, the resource allocator 210 outputs an request for an automatic distribution of memory for computer 20. The unacceptable excessive paging is defined by the guidelines laid out for the employee level and function. System 10 may use other matrixes to define levels of unacceptable performance by computers 20, 25, 30 to identify other components that may require upgrades to bring performance of computers 20, 25, 30 into acceptable bounds. System 10 can use matrixes to define levels of unacceptable performance leading to upgrades of components such as, for example, CPUs, network adapters, disk adapters, disk drives, and other peripheral adapters and devices that are well known in computing.

Comparison of fundamental measurements by system 10, such as CPU over-utilization, may indicate the need for a complete replacement of, for example, computer 20. A table comprises acceptable performance limits for collected parameters that is used to determine whether computers 20, 25, 30 require replacement. Partial upgrades of computers 20, 25, 30 correct performance issues with paging or other I/O considerations. However, processor-based constraints may be indicative of a need for a new computing resource, particularly given the fact that having a service provider add or replace a CPU within a computing resource can cost as much as a new computing resource. In addition, the replaced computing resource can then be redeployed to an employee with lesser computing needs.

System 10 may determine the need for a replacement of computers 20, 25, 30 by examining a composite of various performance parameters. Any one performance parameter that exceeds acceptable limits may indicate only the need for a component upgrade. However, system 10 may determine that several performance parameters exceed acceptable limits concurrently, indicating a need for a new computing resource. For example, a computing resource that demonstrates excessive paging, I/O, and marginally excessive CPU over-utilization may be a candidate for replacement based upon the logistical and cost concerns of upgrading multiple individual components on the computing resource.

System 10 further sets acceptable thresholds for error conditions according to band and job function that indicate a need for component upgrade or replacement of computers 20, 25, 30. For many error conditions, the error threshold may be at or very close to zero. However, non-critical errors may be tolerated in certain situations such as, for example, temporary errors or retry conditions. The non-critical errors are particularly dependent on functions that are being performed by an employee.

The performance agent 205 collects error information on computers 20, 25, 30 by a "trap" method. The trapped error information is forwarded to the resource allocator 210. Resource allocator 210 compares the error information to reference information on related websites operated by vendors of computers 20, 25, 30 to assist in determining problems with computers 20, 25, 30. For example, error information collected when a computing resource using a Windows® operating system "blue-screens" can be referenced in the MS Knowledge base. Several known traps of Windows® operating systems are strong indications of memory errors. Consequently, this information is used by system 10 in determining the need for automatic evaluation of the errors and possible recommendation for replacement of the computing resource.

Figure 3A:
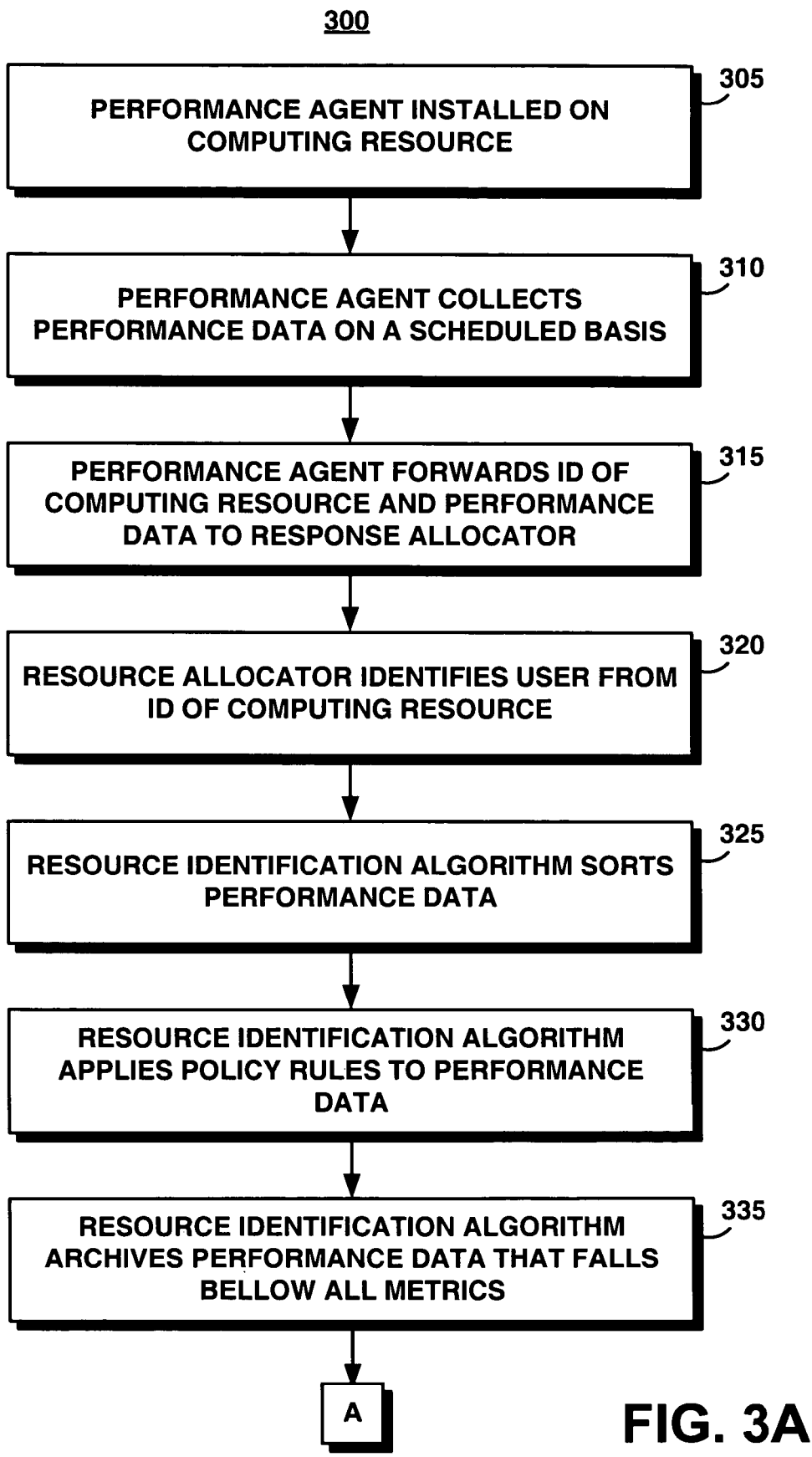
FIG. 3 is comprised of FIGS. 3A and 3B and represents a process flow chart illustrating a method of operation of the computing resource allocation system of FIGS. 1 and 2.
Figure 3B:
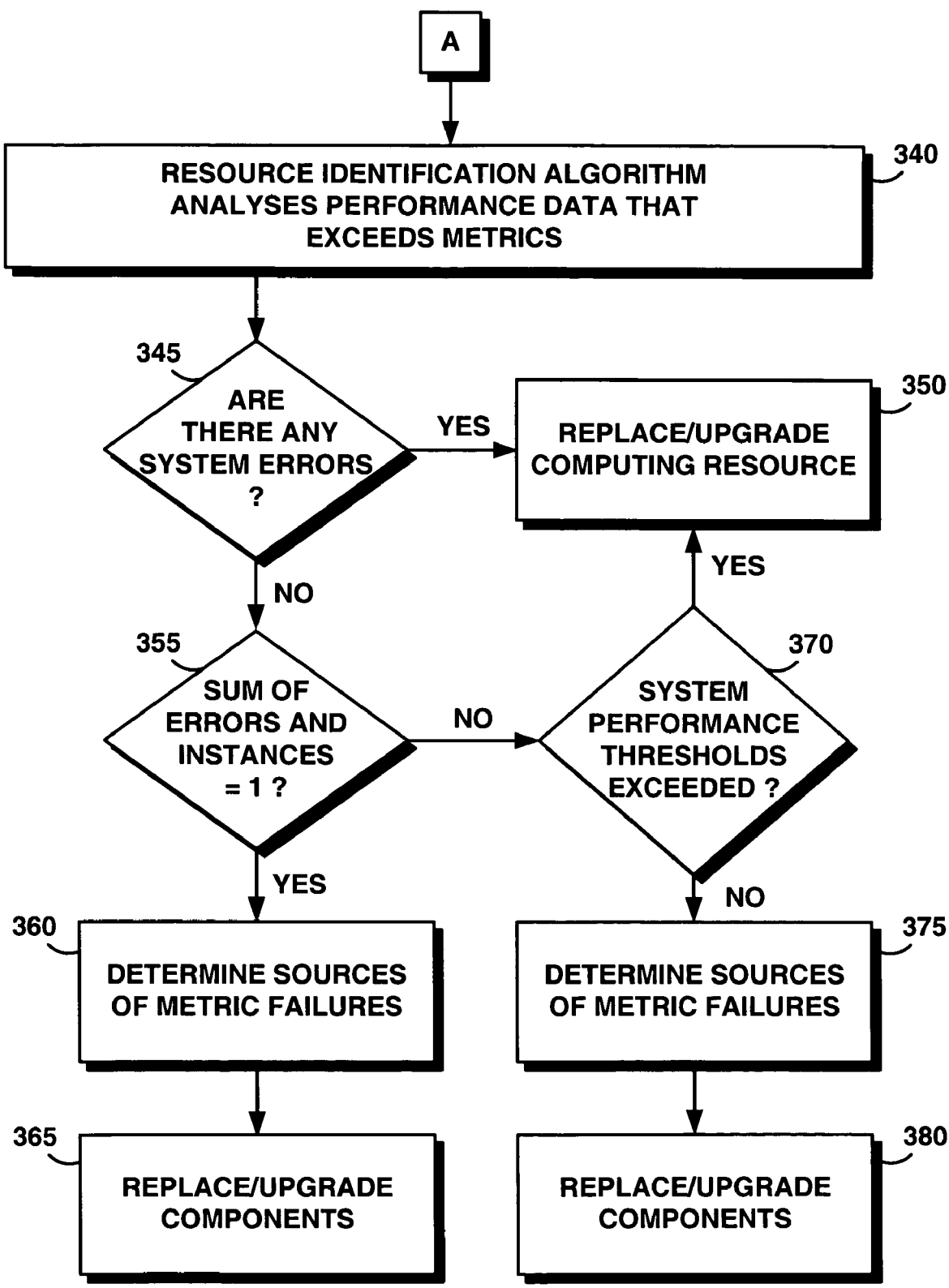

FIG. 3 (FIGS. 3A and 3B) is a flow chart illustrating a method 300 of operation of system 10. At step 305, the performance agent 205 is installed on a computing resource of a user such as computer 20. Each computing resource has an ID that associates the computing resource with the user. The performance agent 205 collects performance data from the computing resource on a scheduled basis at step 310. Performance data comprises errors experienced during operation of the computing resource and measurements quantifying performance of the computing resource. The performance agent 205 forwards performance data and the ID of the computing resource to the resource allocator 210 in step 315. The resource allocator 210 identifies the user of the computing resource at step 320, providing the employee level and job category of the user for use in analyzing the collected performance data.

The resource allocator 210 sorts the performance data with respect to the employee level and job category of the user (step 325). The resource identification algorithm 215 applies policy rules to the performance data at step 330, comparing the performance data with a set of metrics that describe allowable performance for a computing resource for a user at a specific employee level and job category. At step 335, the resource identification algorithm 215 archives performance data that falls below all metrics n the collection dB 220. In an embodiment, performance data that falls below all metrics is discarded. Performance data stored in the collection dB 220 may be accessed by system 10 to determine a cumulative performance of a computing resource, aiding in a determination of component upgrade, component replacement, computing resource upgrade, or computing resource replacement.

The resource identification algorithm 215 analyzes errors and instances in which the collection data exceeds one or more performance metrics (step 340). At decision step 345, the resource identification algorithm 215 determines whether any system errors in the computing resource have occurred. If yes, the resource identification algorithm 215 proceeds to step 350 and recommends replacing or upgrading the computing resource. If the specifications of the present computing resource are adequate for the employee level and job category of the user, the resource identification algorithm 215 recommends a replacement of the computing resource. Otherwise, the resource identification algorithm recommends a computing resource upgrade.

If at decision step 345 the resource identification algorithm 215 detects no system errors, processing proceeds to decision step 355. If at decision step 355 the number of errors or instances in which performance data exceeds metrics is equal to one, the resource identification algorithm 215 determines the source of the performance metric failure at step 360. The resource identification algorithm 215 recommends a replacement or upgrade for the component that is the source of the error or the instance by which performance data exceeds metrics (step 365). If the specifications of the component are adequate for the employee level and job category of the user, the resource identification algorithm 215 recommends a component replacement. Otherwise, the resource identification algorithm 215 recommends a component upgrade.

If at decision step 355 the sum of errors and instances in which performance data exceeds metrics is greater than one, the resource identification algorithm 215 proceeds to decision step 370. The resource identification algorithm 215 determines whether system performance of the computing resource exceeds a metrics threshold. If yes, the resource identification algorithm 215 recommends a replacement or upgrade of the computing resource at step 350. Otherwise, the resource identification algorithm 215 determines the sources of the metric failures at step 375.

There may be several components in the computing resource that are causing metrics failure. If the specifications of the components are adequate for the employee level and job category of the user, the resource identification algorithm 215 recommends replacement of the components. Otherwise, the resource identification algorithm 215 recommends upgrade of the components. The resource identification algorithm 215 may recommend replacement of some components and upgrade of other components, depending on the analysis performed at step 375.

The resource identification algorithm 215 may recommend a replacement of a component or the computing resource based upon a single performance data collection point. For example, if performance data is collected once a night, recommendation may be initiated based upon performance data collected in one night. Alternatively, the replacement recommendation may be dependent upon composite parameters established over multiple performance data collection points. To determine composite parameters, the resource identification algorithm 215 may use a moving average. The moving average may comprise performance data from a computing resource over a long term during which a replacement becomes necessary. Conversely, the moving average may comprise performance data from a computing resource in which a consecutive number of data points in the performance data occur above the thresholds of the metrics.

It is to be understood that the specific embodiments of the invention that have been described are merely illustrative of certain applications of the principle of the present invention. Numerous modifications may be made to a system, method, and service for efficient allocation of computing resources among users described herein without departing from the spirit and scope of the present invention. Moreover, while the present invention is described for illustration purpose only in relation to the WWW, it should be clear that the invention is applicable as well to, for example, any network in which computers or computing resources may be connected together for communications purposes between the computers.

What is claimed is:

1. A method of allocating a plurality of computing resources among a plurality of users, comprising:
    collecting a plurality of performance data including a time percentage in which a computing resource is engaged in excessive paging activity;
    applying a plurality of policy rules to the collected performance data;
    analyzing the collected performance data to determine if there exists an actionable item;
    if an actionable item exists, applying a plurality of metrics including a job description and job level of a user to filter the collected performance data; and
    automatically allocating the computing resources from an automatic hardware of a resource allocator by at least one action based on the actionable item using the collected performance data that has been filtered: upgrading a component, replacing the component, upgrading the computing resource, and replacing the computing resource.

2. The method of claim 1, wherein the collected performance data comprises a time percentage in which the computing resource is engaged in excessive CPU utilization.

3. The method of claim 1, wherein the collected performance data comprises a time percentage in which the computing resource is constrained by input/output devices.

4. The method of claim 3, wherein the collected performance data comprises an association of a plurality of time percentages with an application process operating on the computing resource.

5. The method of claim 1, wherein collecting the performance data comprises logging a plurality of events occurring on the computing resource.

6. The method of claim 1, wherein collecting the performance data comprises logging a plurality of errors experienced by the computing resource.

7. The method of claim 1, wherein the plurality of metrics comprise an allowable component performance of the component correlated with the job description and job level of the user.

8. The method of claim 1, wherein the plurality of metrics comprise an allowable system performance of the computing resource correlated with the job description and job level of the user.

9. The method of claim 1, wherein a level of said excessive paging activity is determined based on the job description of the user.

10. The method of claim 1, wherein a level of said excessive paging activity is determined based on the job level of the user.

11. A method for identifying an optimum allocation of a plurality of component resources and a plurality of computing resources amongst a plurality of users, the method comprising:
    specifying a set of requirements for the optimum allocation of the component resources and the computing resources;

identifying a first set of metrics that indicate a performance level at which a component resources and computing resources are replaced;

identifying a second set of metrics that indicate a performance level at which the component resources and the computing resources are upgraded;

correlating the first set of metrics and the second set of metrics with a user's job description and user's job level to create a metrics table;

invoking an automatic hardware allocation utility of a resource allocator, wherein the first set of metrics, the second set of metrics and the metrics table are used in the automatic hardware allocation utility for consideration; and receiving an optimum allocation of the component resources and the computing resources from the automatic hardware allocation utility, wherein the specified set of requirements are satisfied.

12. The method of claim 11, further comprising collecting a plurality of performance data including a time percentage in which a computing resource is engaged in excessive paging activity; and wherein the collected performance data comprises an association of a plurality of time percentages with an application process operating on the computing resource.

13. The method of claim 12, wherein collecting the performance data comprises logging a plurality of events occurring on the computing resource.

14. The method of claim 12, wherein collecting the performance data comprises logging a plurality of errors experienced by the computing resource.

15. The method of claim 12, further comprising analyzing the collected performance data to determine if there exists an actionable item; if an actionable item exists, applying a plurality of metrics to filter the collected performance data; and automatically allocating the computing resources by at least one action based on the actionable item: upgrading a component, replacing the component, upgrading the computing resource, and replacing the computing resource.

16. The method of claim 12, wherein a level of said excessive paging activity is determined based on the job description of the user.

17. The method of claim 12, wherein a level of said excessive paging activity is determined based on the job level of the user.

18. The method of claim 11, wherein any one of the first set of metrics and the second set of metrics comprises an allowable component performance of the component resource correlated with a the user's job description and job level.

19. The method of claim 11, wherein any one of the first set of metrics and the second set of metrics comprises an allowable system performance of the computing resource correlated with the user's job description and job level.

20. A computer system for allocating a plurality of computing resources among a plurality of users, comprising:

a performance agent
that collects a plurality of performance data including a time percentage in which a computing resource is engaged in excessive paging activity and
that applies a plurality of policy rules to the collected performance data;

an automatic hardware of a resource allocator analyzes the collected performance data to determine if there exists an actionable item;

if an actionable item exists, a resource identification module applies a plurality of metrics including a job description and job level of a user to filter the collected performance data; and the automatic hardware of the resource allocator automatically allocates the computing resources by at least one action based on the actionable item using the collected performance data that has been filtered: upgrading a component, replacing the component, upgrading the computing resource, and replacing the computing resource.

21. The system of claim 20, wherein the collected performance data comprises a time percentage in which the computing resource is engaged in excessive paging activity.

22. The system of claim 20, wherein the collected performance data comprises a time percentage in which the computing resource is engaged in excessive CPU utilization.

23. The system of claim 20, wherein the collected performance data comprises a time percentage in which the computing resource is constrained by input/output devices.

24. The system of claim 23, wherein the collected performance data comprises an association of a plurality of time percentages with an application process operating on the computing resource.

25. The system of claim 20, wherein the performance agent logs a plurality of events occurring on the computing resource.

26. The system of claim 20, wherein the performance agent logs a plurality of errors experienced by the computing resource.

27. The system of claim 20, wherein the pluralities of metrics comprise an allowable component performance of the component correlated with the job description and job level of the user.

28. The system of claim 20, wherein the plurality of metrics comprise an allowable system performance of the computing resource correlated with the job description and job level of the user.

29. The system of claim 20, wherein a level of said excessive paging activity is determined based on the job description of the user.

30. The system of claim 20, wherein a level of said excessive paging activity is determined based on the job level of the user.

* * * * *